United States Patent
Mizunashi et al.

(10) Patent No.: US 10,077,338 B2
(45) Date of Patent: Sep. 18, 2018

(54) CURABLE SILICONE RESIN COMPOSITION

(71) Applicant: SHIN-ETSU CHEMICAL CO., LTD., Tokyo (JP)

(72) Inventors: Tomoyuki Mizunashi, Annaka (JP); Takayuki Kusunoki, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 297 days.

(21) Appl. No.: 14/977,053

(22) Filed: Dec. 21, 2015

(65) Prior Publication Data

US 2016/0185912 A1 Jun. 30, 2016

(30) Foreign Application Priority Data

Dec. 25, 2014 (JP) ................. 2014-262791

(51) Int. Cl.
*C08G 77/12* (2006.01)
*C08L 83/04* (2006.01)
*C08L 83/06* (2006.01)
*C08G 77/16* (2006.01)
*C08G 77/18* (2006.01)
*C08G 77/20* (2006.01)
*C08G 77/00* (2006.01)

(52) U.S. Cl.
CPC ............ *C08G 77/12* (2013.01); *C08L 83/04* (2013.01); *C08L 83/06* (2013.01); *C08G 77/16* (2013.01); *C08G 77/18* (2013.01); *C08G 77/20* (2013.01); *C08G 77/70* (2013.01); *C08G 77/80* (2013.01)

(58) Field of Classification Search
CPC ........ C08G 77/12; C08G 77/16; C08G 77/18; C08G 77/20; C08G 77/70; C08G 77/80; C08K 5/56; C08L 83/00; C08L 83/04; C08L 83/06
USPC ........................................... 428/220; 528/15
See application file for complete search history.

(56) References Cited

U.S. PATENT DOCUMENTS

| | | | |
|---|---|---|---|
| 6,124,407 A | 9/2000 | Lee et al. | |
| 8,362,141 B2 * | 1/2013 | Kato | C08G 77/38 524/588 |
| 8,580,889 B2 * | 11/2013 | Kato | C08L 83/04 524/862 |
| 8,791,213 B2 * | 7/2014 | Mizunashi | G02B 1/041 525/477 |
| 8,877,860 B2 * | 11/2014 | Tasaki | C08L 83/04 524/425 |
| 8,916,646 B2 * | 12/2014 | Kato | C09J 183/06 524/492 |
| 9,587,075 B2 * | 3/2017 | Kusunoki | C08L 83/04 |
| 9,657,175 B2 * | 5/2017 | Kashiwagi | C08L 83/04 |
| 2008/0249244 A1 * | 10/2008 | Meguriya | C08L 83/04 525/100 |
| 2009/0118441 A1 | 5/2009 | Yamamoto et al. | |
| 2012/0135244 A1 * | 5/2012 | Yuki | B05D 5/00 428/414 |
| 2012/0232219 A1 * | 9/2012 | Kato | C08L 83/04 524/862 |
| 2013/0331499 A1 * | 12/2013 | Hamamoto | H01L 33/56 524/500 |
| 2014/0024796 A1 | 1/2014 | Mizunashi et al. | |
| 2016/0108240 A1 * | 4/2016 | Kashiwagi | C08L 83/04 525/478 |
| 2016/0185912 A1 * | 6/2016 | Mizunashi | C08G 77/12 428/220 |
| 2016/0230005 A1 * | 8/2016 | Mayumi | C08L 83/04 |
| 2016/0304673 A1 * | 10/2016 | Kusunoki | C08L 83/04 |
| 2017/0029571 A1 * | 2/2017 | Kusunoki | C08G 77/045 |
| 2017/0283613 A1 * | 10/2017 | Mochizuki | C08L 83/04 |

FOREIGN PATENT DOCUMENTS

| | | |
|---|---|---|
| JP | 2006-213789 A | 8/2006 |
| JP | 2007-131694 A | 5/2007 |
| JP | 2008-156578 A | 7/2008 |
| JP | 4180474 B2 | 11/2008 |
| JP | 2011-252175 A | 12/2011 |

OTHER PUBLICATIONS

May 6, 2016 Extended Search Report issued in European Patent Application No. 15201923.8.

* cited by examiner

*Primary Examiner* — Douglas J McGinty
(74) *Attorney, Agent, or Firm* — Oliff PLC

(57) ABSTRACT

A curable silicone resin composition including: (A) an organopolysiloxane having at least two alkenyl groups per molecule, each bonded to a silicone atom and showing a viscosity of 10 to 1,000,000 mPa·s at 25 degrees C., and (B) an organopolysiloxane having a resin structure composed of 10 to 80 mol % of $SiO_{4/2}$ unit, 0.1 to 80 mol % of $(R^1)_2SiO_{2/2}$ unit and 1 to 60 mol % of $(R^2)_3SiO_{1/2}$ unit and having a weight average molecular weight of 1,000 to 10,000. $R^1$ represents an alkenyl group having 2 to 8 carbon atoms, or a substituted or unsubstituted, monovalent hydrocarbon group having no aliphatic unsaturated group, and $R^2$ represents, independently of each other, an alkenyl group having 2 to 8 carbon atoms, or a substituted or unsubstituted, monovalent hydrocarbon group having no aliphatic unsaturated group, provided that at least one among all of $R^2$ is an alkenyl group.

16 Claims, No Drawings

CURABLE SILICONE RESIN COMPOSITION

CROSS REFERENCE

This application claims the benefits of Japanese Patent Application No. 2014-262791 filed on Dec. 25, 2014, the contents of which are herein incorporated by reference.

FIELD OF THE INVENTION

The present invention relates to a curable silicone resin composition of an addition cure type.

BACKGROUND OF THE INVENTION

Materials having good transparency, refractive index, mechanical strengths such as tensile strength and elongation at break, and heat and light resistances are needed for encapsulating materials for LEDs, and lens. Epoxy resins, poly(meth)acrylates and polycarbonates have mostly been used in the prior art. However, heat resistances and discoloration resistances of these resins are insufficient in conditions of high power of LED light-emitting devices and high temperatures of a long period of time.

When LEDs are soldered to substrates, lead-free solders are mostly used recently. The lead-free solders have higher melting temperatures than old-type solders and, therefore, soldering is conducted usually at a temperature of 260 degrees C. or higher. Then, the previous encapsulating materials and lens made of the thermoplastic resin sometimes change their shapes, or turn yellow at such a high temperature.

Then, compositions comprising silicones resins, called MQ resins, composed of M units and Q units were proposed in the following patent literatures 1, 2 and 3. Cured products of these compositions have excellent transparency and heat resistance, but have poor mechanical strengths and high gas permeability. As a result, brightness of LEDs becomes lower due to sulfurization of electrodes, which is a drawback.

A composition comprising a vinyl resin having T unit, i.e., $PhSiO_{3/2}$, and an MQ resin having an SiH group is known to lower a gas permeability in the following patent literature 4. A cured product of this composition has sufficient mechanical strengths, but shows poor heat resistance, and discoloration in a long term of heating, which is a drawback.

A composition comprising a silicone resin composed of M units, D units and Q units is also known in the following patent literature 5. This composition is good in handling properties and self-adhesion property. However, a cured product of this composition has an insufficient refractive index, insufficient mechanical strengths and a large gas permeability.

PRIOR LITERATURES

Patent Literatures

[Patent Literature 1] Japanese Patent Application Laid-Open No. 2006-213789
[Patent Literature 2] Japanese Patent Application Laid-Open No. 2007-131694
[Patent Literature 3] Japanese Patent Application Laid-Open No. 2011-252175
[Patent Literature 4] Japanese Patent No. 4180474
[Patent Literature 5] Japanese Patent Application Laid-Open No. 2008-156578

DISCLOSURE OF THE INVENTION

Problems to be Solved by the Invention

The present invention has been made under the aforementioned conditions and provides a silicone resin composition which gives a cured product which has a high transparency and a high refractive index, and is excellent in adhesion properties, heat resistance, mechanical properties, low gas permeability and tack-free property. This is the purpose of the invention.

Means to Solve the Problems

The present inventors have made various researches and have found that the aforesaid purpose is attained by a silicone resin composition comprising an organopolysiloxane comprising M units, D units and Q units and specific amounts of a hydroxyl group bonded to a silicon atom and an alkoxy group bonded to a silicon atom, where the composition comprises a specific amount of an aryl group bonded to a silicon atom. Thus, the present invention has been made.

The present invention provides a curable silicone resin composition comprising (A) an organopolysiloxane having at least two alkenyl groups per molecule, each bonded to a silicone atom and showing a viscosity of 10 to 1,000,000 mPa·s at 25 degrees C., (B) an organopolysiloxane having a resin structure composed of 10 to 80 mol % of $SiO_{4/2}$ unit, 0.1 to 80 mol % of $(R^1)_2SiO_{2/2}$ unit and 1 to 60 mol % of $(R^2)_3SiO_{1/2}$ unit and having a weight average molecular weight of 1,000 to 10,000, wherein $R^1$ represents, independently of each other, an alkenyl group having 2 to 8 carbon atoms, or a substituted or unsubstituted, monovalent hydrocarbon group having no aliphatic unsaturated group, and $R^2$ represents, independently of each other, an alkenyl group having 2 to 8 carbon atoms, or a substituted or unsubstituted, monovalent hydrocarbon group having no aliphatic unsaturated group, provided that at least one among all of $R^2$ is an alkenyl group; an amount of a hydroxyl group bonded to a silicon atom in component (B) is 0.01 to 15.0 mass %, relative to a total mass of component (B); and an amount of an alkoxy group bonded to a silicon atom in component (B) is 0.01 to 15.0 mass %, relative to a total mass of component (B), (C) an organohydrogenpolysiloxane having at least two hydrogen atoms per molecule, each bonded to a silicon atom, and (D) platinum-group metal catalyst, wherein an amount of component (B) is 70 to 100 mass %, relative to a total mass of components (A) and (B); and the number of the aryl group bonded to a silicon atom is 10 to 90%, relative to a total number of the hydrogen atoms each bonded to a silicon atom and the groups each bonded to a silicon atom, including the aryl group bonded to a silicone atom, in the composition.

Effects of the Invention

The present curable silicone composition has a high transparency and a high refractive index, and is excellent in adhesion properties, heat resistance, mechanical properties, and low gas permeability. It is excellent also in a tack-free property, so that dust does not easily adhere to a surface of it. Accordingly, the composition is very useful as a material for LEDs and lens.

BEST MODE OF THE INVENTION (A) Organopolysiloxane Resin

Component (A) is an organopolysiloxane resin having at least two alkenyl groups per molecule. Example of the alkenyl group include those having 2 to 8 carbon atoms, preferably 2 to 6 carbon atoms, such as vinyl, allyl, propenyl, isopropenyl, butenyl, hexenyl, cyclohexenyl and octenyl groups. Component (A) has a viscosity of 10 to 1,000,000 mPa·s, preferably 100 to 500,000 mPa·s, at 25 degrees C. If the viscosity is less than the aforesaid lower limit, molding is difficult. If the viscosity exceeds the aforesaid upper limit, handling is difficult and voids might occur. Component (A) may have, besides the aforesaid alkenyl group, other groups bonded to a silicon atom, such as monovalent hydrocarbon groups having 1 to 10 carbon atoms, preferably 1 to 6 carbon atoms, more specifically, alkyl groups such as methyl, ethyl, propyl, isopropyl, butyl, isobutyl, tert-butyl, pentyl, neopentyl, hexyl, cyclohexyl, octyl, nonyl and decyl groups; aryl groups such as phenyl, tolyl, xylyl, and naphthyl groups; aralkyl groups such as benzyl, phenylethyl and phenylpropyl groups; and those groups where a part or the whole of their hydrogen atoms are replaced with a halogen atom(s), such as fluorine, bromine and chlorine atoms, or a cyano group, such as halogen-substituted alkyl groups, for instance, chloromethyl, chloropropyl, bromoethyl and trifluoropropyl groups, and a cyanoethyl group. Component (A) is preferably a linear organopolysiloxane having at least one alkenyl group on each silicon atom at the both terminals of the molecule, as represented by the following general formula (1), but may comprise a small amount (for instance, 30 mol % or less) of branched structure (i.e., tri-functional unit) in the molecule.

The viscosity in the present specification is determined with a rotational viscometer at 25 degrees C.

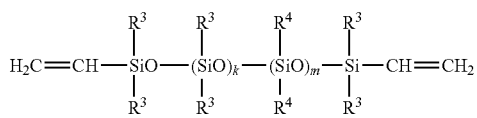

wherein $R^3$ is, independently of each other, a substituted or unsubstituted, monovalent hydrocarbon group; $R^4$ is, independently of each other, a substituted or unsubstituted monovalent hydrocarbon group having no aliphatic unsaturated bond; and k and m are an integer of zero or larger.

The aforesaid $R^3$ preferably has 1 to 10 carbon atoms, more preferably 1 to 6 carbon atoms, and includes an alkyl group such as methyl, ethyl, propyl, isopropyl, butyl, isobutyl, tert.-butyl, pentyl, neopentyl, hexyl, cyclohexyl, octyl, nonyl and decyl groups; aryl groups such as phenyl, tolyl, xylyl, and naphthyl groups; aralkyl groups such as benzyl, phenylethyl and phenylpropyl groups; alkenyl groups such as vinyl, allyl, propenyl, isopropenyl, butenyl, hexenyl, cyclohexenyl and octenyl groups; and those groups where a part or the whole of their hydrogen atoms are replaced with a halogen atom(s), such as fluorine, bromine and chlorine atoms, or a cyano group, such as halogen-substituted alkyl groups, for instance, chloromethyl, chloropropyl, bromoethyl and trifluoropropyl groups, and a cyanoethyl group.

The aforesaid $R^4$ preferably has 1 to 10 carbon atoms, more preferably 1 to 6 carbon atoms, may be those mentioned for $R^3$, but is not an alkenyl group.

k and m are an integer of zero or larger and, preferably, meet the equations: $0<k+m\leq10,000$, more preferably $5\leq k+m\leq2,000$, and $0<k/(k+m)\leq0.2$.

Component (A) preferably has an aryl group bonded to a silicon atom. It is preferred in view of a refractive index and gas permeability that a ratio of the total number of the aryl group bonded to a silicon atom, relative to the total number of the groups bonded to silicon atoms of component (A) is 10 to 80%, more preferably 30 to 75%, further preferably 40 to 70%. Examples of the aryl group include phenyl, tolyl and benzyl groups, preferably a phenyl group.

Examples of Component (A) include the following.

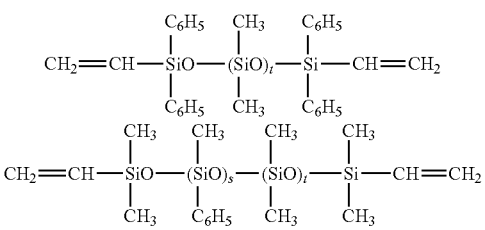

wherein s and t are an integer of 8 to 2,000.

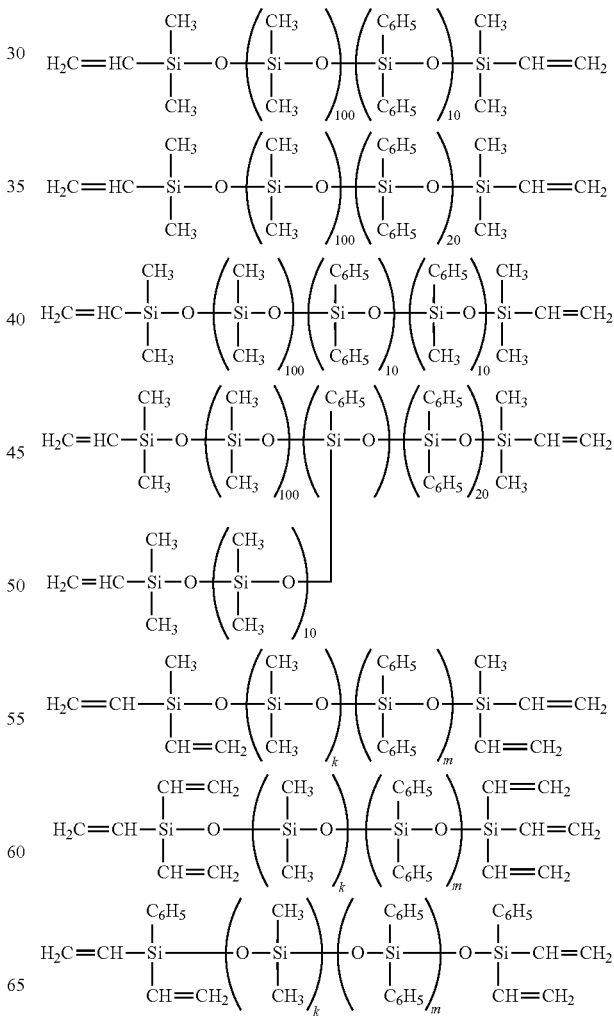

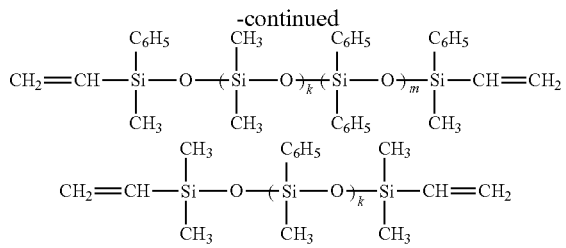

wherein k and m are an integer of zero or larger.

(B) Organopolysiloxane Having a Resin Structure

Component (B), organopolysiloxane, has a resin structure, i.e., three-dimensional network structure, comprising 10 to 80 mol %, preferably 20 to 70 mol %, of $SiO_{4/2}$ unit (or Q unit), 0.1 to 80 mol %, preferably 0.1 to 70 mol %, of $(R^1)_2SiO_{2/2}$ unit (or D unit) and 1 to 60 mol %, preferably 5 to 55 mol %, of $(R^2)_3SiO_{1/2}$ unit (or M unit). Component (B) does not have $RSiO_{3/2}$ unit (or T unit). This is because heat resistance is worse if T unit is contained.

In the aforesaid formula, $R^1$ represents, independently of each other, an alkenyl group having 2 to 8 carbon atoms, preferably 2 to 6 carbon atoms, or a substituted or unsubstituted, monovalent hydrocarbon group having no aliphatic unsaturated group, and $R^2$ represents, independently of each other, an alkenyl group having 2 to 8 carbon atoms, preferably 2 to 6 carbon atoms, or a substituted or unsubstituted, monovalent hydrocarbon group having no aliphatic unsaturated group. At least one among all of $R^2$ is an alkenyl group.

Preferred examples of the alkenyl group for $R^1$ and $R^2$ are a vinyl group and an allyl group. Component (B) has at least one alkenyl group bonded to a silicon atom. For instance, the number of the alkenyl groups may be 1 to 50%, preferably 2 to 40%, more preferably 3 to 30%, of the total number of $R^1$ and $R^2$.

The substituted or unsubstituted, monovalent hydrocarbon group having no aliphatic unsaturated group for $R^1$ and $R^2$ preferably has 1 to 10 carbon atoms, more preferably 1 to 6 carbon atoms and includes lower alkyl groups such as methyl, ethyl, propyl and butyl groups; cycloalkyl groups such as cyclohexyl group; aryl groups such as phenyl, tolyl, and xylyl groups; aralkyl groups such as a benzyl group; and those groups where a part or the whole of their hydrogen atoms are replaced with a halogen atom(s) or a cyano group(s), such as chloromethyl, cyanoethyl, and 3,3,3-trifluoropropyl groups. It is preferred in view of a refractive index and gas permeability that at least one of $R^1$ and $R^2$ is an aryl group and the number of the aryl group, preferably the phenyl group is, for instance, 1 to 90%, preferably 10 to 80%, more preferably 20 to 70%, of a total number of $R^1$ and $R^2$.

Component (B) has a weight average molecular weight (hereinafter, referred to as Mw) of 1,000 to 10,000, preferably 1,200 to 8,000, more preferably 1,500 to 5,000. If Mw is less than the lower limit, storage stability, and mechanical strengths of a cure product are worse. If MW exceeds the upper limit, the viscosity is too large, so that handling is difficult.

The Mw mentioned in the present specification is determined by gel permeation chromatography (GPC) and reduced to polystyrene, in the following conditions.

Developing solvent: THF
Flow rate: 0.6 mL/min
Detector: Differential refractive index detector (RI)
Column: TSK Guardcolumn SuperH-L
TSKgel SuperH4000 (6.0 mm I.D.×15 cm×1)
TSKgel SuperH3000 (6.0 mm I.D.×15 cm×1)
TSKgel SuperH2000 (6.0 mm I.D.×15 cm×2)
(all produced by TOSO Co. Ltd.)
Column temperature: 40 degrees C.
Injection volume: 20 µL (0.5 mass % solution in THF)

Component (B) comprises the hydroxyl group bonded to a silicon atom in an amount of 0.01 to 15.0 mass %, preferably 0.01 to 12.0 mass %, more preferably 0.05 to 10.0 mass %, relative to a total mass of component (B). If the amount is less than the lower limit, adhesion properties may be worse. If the amount exceeds the upper limit, a condensation reaction proceeds with time, so that storage stability may be worse and dust may adhere to a surface of a cured product due to tackiness of the surface. Component (B) comprises the alkoxy group bonded to a silicon atom, preferably the alkoxy group having 1 to 6 carbon atoms, such as methoxy, ethoxy and isopropoxy groups, in an amount of 0.01 to 15.0 mass %, preferably 0.01 to 10.0 mass %, more preferably 0.05 to 8.0 mass %, relative to a total mass of component (B). If the amount exceeds the upper limit, storage stability may become worse and dust may adhere to the surface due to tackiness of the surface. If the amount is less than the lower limit, adhesion properties may be worse. The amounts of the hydroxyl group and the alkoxy group are determined by $^1$H-NMR.

Component (B) may be easily synthesized by preparing compounds as a Q unit source, a D unit source and an M unit source in the aforesaid mol ratio, subjecting them to co-hydrolytic condensation in the presence of an acidic or basic catalyst, or to de-alkoxylation with a metal salt or metal hydroxide, followed by condensation.

The $SiO_{4/2}$ unit source may be sodium silicate, tetraalkoxy silane or a condensation product thereof.

The $(R^1)_2SiO_{2/2}$ unit source may be organic silicon compounds such as, for instance, diorganochlorosilanes and diorganoalkoxysilanes represented by the following structural formulae, but not limited to these. In the following formulae, $R^3$ is a hydrogen atom, an alkenyl group having 2 to 8 carbon atoms, or a substituted or unsubstituted, monovalent hydrocarbon group having no aliphatic unsaturated group. The alkenyl group and the monovalent hydrocarbon group as $R^3$ include those mentioned for $R^1$ and $R^2$ above.

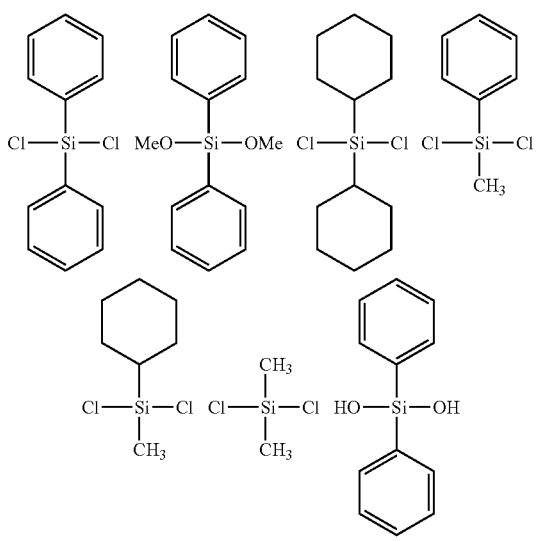

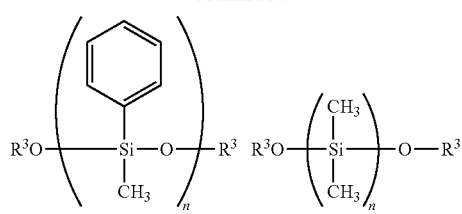
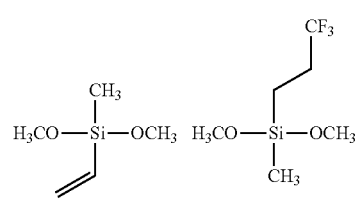
The $(R^2)_3SiO_{1/2}$ source may be organic silicon compounds represented by the following structural formulae, such as triorganochlorosilane, triorganoalkoxysilane, and hexaorganodisiloxane, but not limited to these.
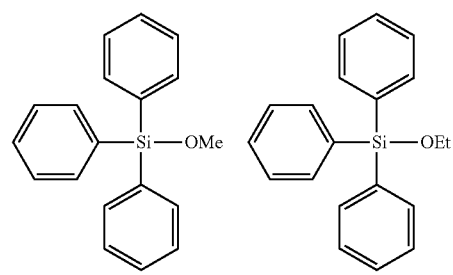
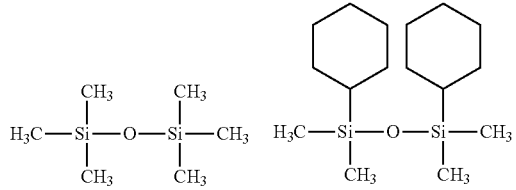
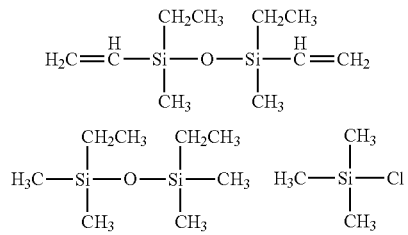
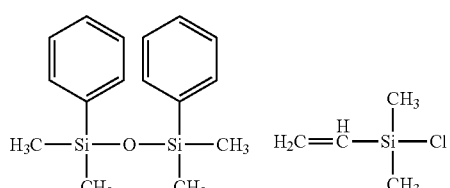
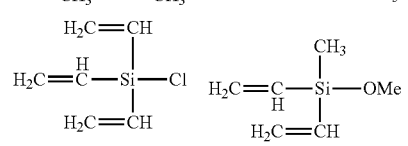
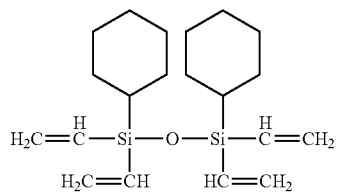
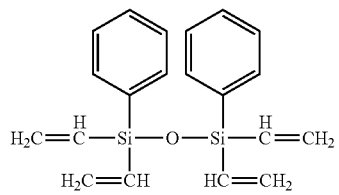
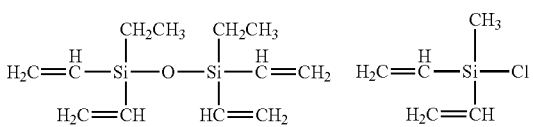
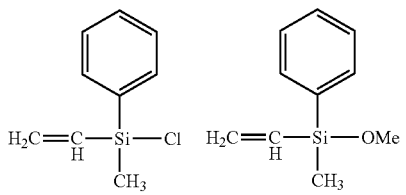
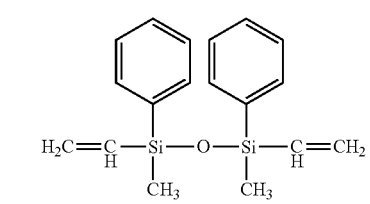
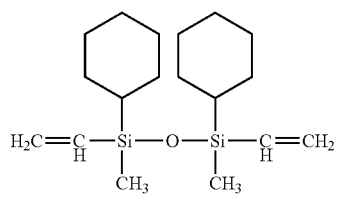
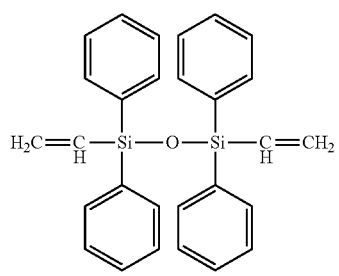
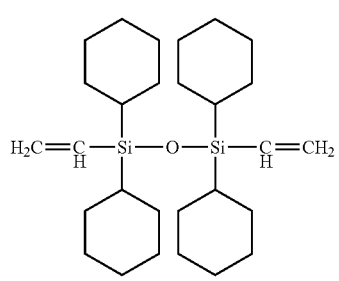

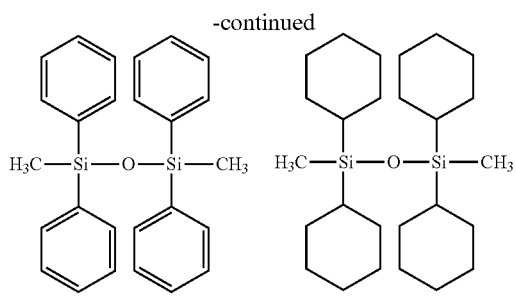

Component (B) may be a single compound or a mixture of two or more compounds. The amount of component (B) is 70 to 100 mass %, preferably 75 to 90 mass %, relative to a total mass of components (A) and (B). If the amount is less than the lower limit, mechanical strengths and gas permeation resistance might be insufficient.

(C) Organohydrogenpolysiloxane

Component (C) is an organohydrogenpolysiloxane having at least two hydrogen atoms per molecule, each bonded to a silicon atom (i.e., SiH group). Component (C) functions as a crosslinking agent. The SiH group in the component (C) addition reacts with the alkenyl group in the components (A) and (B) to form a cured product. The structure of component (C) is not particularly limited, and may be linear, branched, cyclic or resinous, preferably linear, branched, or resinous. A position at which the SiH group bends is not particularly limited, and may be, or may not be, a terminal of the molecule chain. Preferred is a linear organohydrogenpolysiloxane having each at least one hydrogen atom bonded to a silicon atom at the both terminals. Component (C) may be a single compound or a mixture of two or more compounds.

Component (C) preferably comprises $SiO_{4/2}$ unit in an amount of less than 5 mol %, more preferably does not comprise $SiO_{4/2}$ unit. If the amount of $SiO_{4/2}$ unit is 5 mol % or more, a viscosity of the composition is too large, so that handling of the composition is difficult, and a cured product is sometimes brittle.

It is preferred in view of a refractive index and gas permeability that 5 to 90%, more preferably 10 to 80%, of the number of the hydrogen atoms each bonded to a silicon atom and the groups each bonded to a silicon atom in component (c) is of the number of an aryl group, preferably a phenyl group.

The groups other than the hydrogen atom, bonded to a silicon atom (hereinafter referred to as $R^5$) in component (C) may be substituted or unsubstituted, monovalent hydrocarbon groups having no aliphatic unsaturated bond, such as lower alkyl groups such as methyl, ethyl, propyl and butyl groups; cycloalkyl groups such as a cyclohexyl group; aryl groups such as phenyl, tolyl and xylyl groups; aralkyl groups such as a benzyl group; and those groups where a part or the whole of their hydrogen atoms are replaced with a halogen atom(s) or a cyano group(s), such as chloromethyl, cyanoethyl, and 3,3,3-trifluoropropyl groups, preferably a methyl group and a phenyl group.

A viscosity of component (C) is not particularly limited, but preferably 1 to 100,000 mPa·s, more preferably 1 to 10,000 mPa·s, at 25 degrees C.

Examples of component (C) include dimethylpolysiloxane with both ends blocked with dimethylhydrogensiloxy groups, diphenylpolysiloxane with both ends blocked with dimethylhydrogensiloxy groups, tris(hydrogendimethylsiloxy)phenylsilane, methylhydrogencyclopolysiloxane, copolymers of methylhydrogensiloxane and diphenylsiloxane with both ends blocked with trimethylsiloxy groups, copolymers of methylhydrogensiloxane, diphenylsiloxane and dimethylsiloxane with both ends blocked with trimethylsiloxy groups, copolymers composed of $(CH_3)_2HSiO_{1/2}$ unit, $(C_6H_5)_2SiO_{2/2}$ unit and $CH_3SiO_{3/2}$ unit, copolymers composed of $SiO_{4/2}$ unit, $(C_6H_5)_2SiO_{2/2}$ unit, $(C_6H_5)(CH_3)_2SiO_{1/2}$ unit and $(CH_3)_2HSiO_{1/2}$ unit, or of any of these units, but not limited to these examples.

Component (C) may be obtained usually by hydrolyzing chlorosilane such as $R^5SiHCl_2$, $(R^5)_3SiCl$, $(R^5)_2SiCl_2$, and $(R^5)_2SiHCl$, wherein $R^5$ is as defined above, or by equilibrating the siloxane obtained by hydrolysis. However, this preparation method and the starting materials are not limitative.

An amount of component (C) is preferably such that a ratio of the total number of the SiH groups in component (C) to the total number of the alkenyl groups in components (A) and (B) is 0.1 to 4.0, more preferably 0.3 to 3.0. If the amount is less than the lower limit, a curing reaction does not proceed sufficiently and it is difficult to obtain a cured product. If the amount is larger than the upper limit, a rubber property of a cured product changes with time, because a lot of the unreacted SiH group remain in the cured product.

(D) Platinum-Group Metal Catalyst

Component (D) is added to accelerate an addition reaction and may be a catalyst composed of platinum, palladium or rhodium. The platinum type ones, such as platinum, platinum black and chloroplatinic acid, are preferred in view of costs. Examples of these include $H_2PtCl_6 \cdot mH_2O$, $K_2PtCl_6$, $KHPtCl_6 \cdot mH_2O$, $K_2PtCl_4$, $K_2PtCl_4 \cdot mH_2O$, $PtO_2 \cdot mH_2O$, wherein m is a positive integer, and complexes of these with a hydrocarbon such as an olefin, with an alcohol or with a vinyl group-containing organopolysiloxane. The afore-mentioned catalysts may be used alone or in combination thereof.

Component (D) may be used in a so-called catalytic amount, usually 0.1 to 1,000 ppm by mass, preferably 0.5 to 200 ppm by mass, as reduced to a platinum group metal, relative to total mass of the components (A), (B) and (C). If the amount is less than the lower limit, the hydrosilylation does not proceed sufficiently and curing is not enough. If the amount is larger than the upper limit, discoloration might occur.

The present curable silicon resin composition comprises an aryl group bonded to a silicon atom. The number of the aryl group bonded to a silicon atom accounts for 10 to 90%, preferably 15 to 80%, more preferably 20 to 70%, of the total number of the hydrogen atoms each bonded to a silicon atom and the groups each bonded to a silicon atom, including the aryl group bonded to a silicone atom, in the composition. If the amount is less than the lower limit, mechanical properties, transparency and gas permeation resistance of a cured product may be insufficient. If the amount exceeds the upper limit, heat resistance may be lower.

If needed, the present curable silicone resin composition may further comprise an adhesion-imparting agent and other additives in addition to components (A) to (D). Examples of the adhesion-imparting agent include vinyltrimethoxysilane, vinyltriethoxysilane, 2-(3,4-epoxycyclohexyl)ethyltrimethoxysilane, 3-glysidoxypropyltrimethoxysilane, 3-glysidoxypropylmethyldiethoxysilane, 3-glysidoxypropyltriethoxysilane, 3-methacryloxypropylmethyldiethoxysilane, 3-methacryloxypropyltriethoxysilane, N-2(aminoethyl)3-aminopropylmethyldimethoxysilane, N-2(aminoethyl)3-aminopropyltrimethoxysilane, N-2(aminoethyl)3-aminopropyltriethoxysilane, N-phenyl-3-aminopropyltrimethoxylsilane and 3-mercaptopropyltrimethoxylsilane; and trimethoxysilane, tetramethoxysilane, and oligomers thereof. The afore-mentioned adhesion-imparting agent may be used alone or in combination thereof. An amount of the adhesion-imparting agent ranges from 0 to 10 mass %, preferably 0 to 5 mass %, relative to the total mass of components (A), (B), (C) and (D).

Examples of the additives include reinforcing inorganic fillers such as glass fiber, fumed silica and fumed titanium dioxide; and non-reinforcing inorganic fillers such as calcium carbonate, calcium silicate, titanium dioxide, iron (III) oxide, carbon black and zinc oxide. These may be added in an amount of at most 600 parts by mass, such as 0 to 600 parts by mass, usually 1 to 600 parts by mass, preferably 10 to 400 parts by mass, relative to a total 100 parts by mass of components (A), (B), (C) and (D).

The present curable silicone resin composition may be prepared by homogeneously mixing the aforesaid components. Typically, these components are separated into two liquids and stored in separate containers to avoid premature curing, and mixed at the time of use to cause curing. If the component (C) and component (D) are stored together in one container, dehydrogenation may occur. Therefore, it is preferred to store the component (C) and component (D) separately. Alternatively, a small amount of a cure inhibitor such as acetylenealcohol may be added to a mixture of the components (A), (B), (C) and (D) to store in a form of single liquid.

The present curable silicone composition may be coated on a substrate suitable for an intended usage, and cured. Curing takes place sufficiently even at room temperature (or 25 degrees C.). If needed, the composition may be heated to cure. The heating temperature may be, for instance, 60 to 200 degrees C.

The present curable silicone composition cures in a short time, if needed, under heating, to form a cured product which has high hardness and excellent mechanical properties. That is, the cured product obtained by curing the present composition has a tensile strength of at least 2.0 MPa and an elongation at break of at least 40%, as determined in accordance with JIS (Japanese Industrial Standards) K6249: 2003, and a hardness of 20 to 60, as measured with a Durometer D hardness meter. When the present composition is cured at 150 degrees C. for one hour, a cured product has a hardness corresponding to at least 70% of a hardness of a product obtained by curing of 4 hours.

The cured product from the present curable silicone composition has a refractive index so high as 1.46 to 1.60, and a water vapor permeability so low as at most 30 g/m²·day with a thickness of the cured product.

The present curable silicone composition may be used widely in applications where cracks in a cured silicone product might occur due to change in temperature or gas permeability is important, or a high refractive index is needed. More specifically, the composition may be used in a protective coating material for electric or electronic parts and optoelectronic parts, a mold material, a lens material, and a casting material; as a potting material or casting material for these parts; as a surface coat for silicone rubber keyboards. The composition is useful, in particular, as a sealing material for LEDs, and a material for lens.

EXAMPLES

The present invention will be explained below in further detail with reference to a series of the Examples and the Comparative Examples, though the present invention is in no way limited by these Examples. In the following descriptions, the term "part" means part by mass, the viscosity is as determined at 25 degrees C., "Me" represents a methyl group, "Vi" represents a vinyl group, and "Ph" represents a phenyl group.

Example 1

Well mixed were 5 parts of an organopolysiloxane as component (A), which is represented by the following formula and has a viscosity of 4,000 mPa·s:

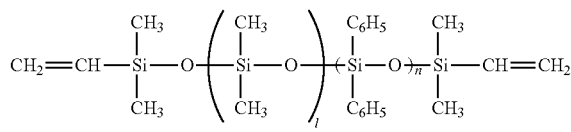

wherein 1 is 10 and n is 8;

30 parts of a vinylphenylmethylpolysiloxane (PVMQ) as component (B), with a resin structure composed of 36 mol % of $SiO_{4/2}$, 36 mol % of $Ph_2SiO_{2/2}$ and 28 mol % of $ViMe_2SiO_{1/2}$ (Mw, 2,000; the amount of the hydroxyl group bonded to a silicon atom, 6 mass %; the amount of the alkoxy group (MeO) bonded to a silicon atom, 0.2 mass %);

an organohydrogenpolysiloxane as component (C), represented by the following formula:

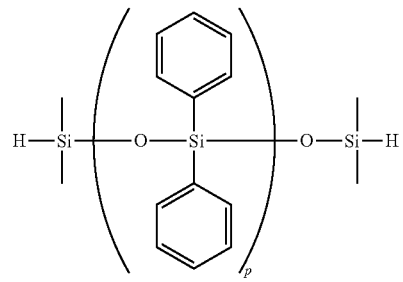

wherein p is 2, in such an amount that a ratio of the total number of the hydrogen atoms each bonded to a silicon atom in component (C) to the total number of the vinyl groups each bonded to a silicon atom in components (A) and (B) (hereinafter, referred to as "SiH/SiVi ratio") is 1.0; and 0.05 part of a solution of chloroplatinic acid in octyl alcohol, containing 2 mass % of platinum, as component (D), to prepare a silicone rubber composition, wherein a ratio of the number of the phenyl groups each bonded to a silicon atom in the composition to the total number of the hydrogen atoms each bonded to a silicon atom and the groups each bonded to a silicon atom in the composition (hereinafter referred to as "amount of the phenyl group bonded to a silicon atom in the composition") was 48%. This composition was shaped under heating at 150 degrees C. for 4 hours to obtain a cured product of 120 mm by 110 mm by 1 mm, which was then subjected to the determination of physical properties, as will be described below. The results are as shown in Table 1.

Example 2

Well mixed were 5 parts of component (A) as used in Example 1, 50 parts of a vinylphenylmethylpolysiloxane (PVMQ) as component (B), with a resin structure composed of 40 mol % of $SiO_{4/2}$, 40 mol % of $Ph_2SiO_{2/2}$ and 20 mol % of $MePhViSiO_{1/2}$ (Mw, 2,300; the amount of the hydroxyl group bonded to a silicon atom, 13 mass %; the amount of the alkoxy group (MeO) bonded to a silicon atom, 0.6 mass %), the organohydrogenpolysiloxane as used in Example 1 as component (C) in such an amount as to give an SiH/SiVi ratio of 1.0, and 0.05 part of a solution of chloroplatinic acid in octyl alcohol, containing 2 mass % of platinum, as component (D), to prepare a silicone rubber composition wherein an amount of the phenyl group bonded to a silicon atom in the composition was 60%. A cured product was prepared as in Example 1, which was then subjected to the determination of physical properties, as in Example 1. The results are as shown in Table 1.

Example 3

Well mixed were 7 parts of an organopolysiloxane represented by the following formula and has a viscosity of 4,500 mPa·s:

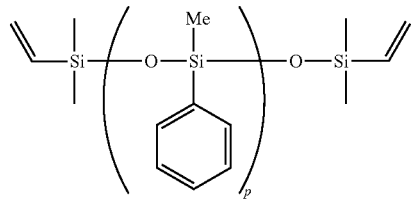

wherein p=30, 30 parts of component (B) as used in Example 1, the organohydrogenpolysiloxane as used in Example 1 as component (C) in such an amount as to give an SiH/SiVi ratio of 1.0, and 0.05 part of a solution of chloroplatinic acid in octyl alcohol, containing 2 mass % of platinum, as component (D), to prepare a silicone rubber composition wherein an amount of the phenyl group bonded to a silicon atom in the composition was 46%. A cured product was prepared as in Example 1, which was then subjected to the determination of physical properties, as in Example 1. The results are as shown in Table 1.

Example 4

Well mixed were 7 parts of component (A) as used in Example 3, 30 parts of component (B) as used in Example 2, an organohydrogenpolysiloxane represented by the following formula:

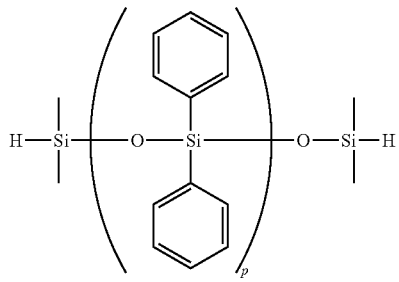

wherein p=1, as component (C) in such an amount as to give an SiH/SiVi ratio of 1.0, and 0.05 part of a solution of chloroplatinic acid in octyl alcohol, containing 2 mass % of platinum, as component (D), to prepare a silicone rubber composition wherein an amount of the phenyl group bonded to a silicon atom in the composition was 40%. A cured product was prepared as in Example 1, which was then subjected to the determination of physical properties, as in Example 1. The results are as shown in Table 1.

Example 5

Well mixed were 10 parts of component (A) as used in Example 3, 30 parts of a vinylphenylmethylpolysiloxane (PVMQ) as component (B), with a resin structure composed of 40 mol % of $SiO_{4/2}$, 20 mol % of $Me_2SiO_{2/2}$, 20 mol % of $Ph_2SiO_{2/2}$ and 20 mol % of $MePhViSiO_{1/2}$ (Mw, 3,000; the amount of the hydroxyl group bonded to a silicon atom, 5 mass %; the amount of the alkoxy group (MeO) bonded to a silicon atom, 0.6 mass %), the organohydrogenpolysiloxane as used in Example 4, as component (C) in such an amount as to give an SiH/SiVi ratio of 1.0, and 0.05 part of a solution of chloroplatinic acid in octyl alcohol, containing 2 mass % of platinum, as component (D), to prepare a silicone rubber composition wherein an amount of the phenyl group bonded to a silicon atom in the composition was 30%. A cured product was prepared as in Example 1, which was then subjected to the determination of physical properties, as in Example 1. The results are as shown in Table 1.

Comparative Example 1

Well mixed were 20 parts of component (A) as used in Example 3, 30 parts of component (B) as used in Example 1, the organohydrogenpolysiloxane as used in Example 1, as component (C), in such an amount as to give an SiH/SiVi ratio of 1.0, and 0.05 part of a solution of chloroplatinic acid in octyl alcohol, containing 2 mass % of platinum, as component (D), to prepare a silicone rubber composition wherein an amount of the phenyl group bonded to a silicon atom in the composition was 48%. A cured product was prepared as in Example 1, which was then subjected to the determination of physical properties, as in Example 1. The results are as shown in Table 2.

Comparative Example 2

Well mixed were 5 parts of an organopolysiloxane, as component (A), represented by the following formula and has a viscosity of 3,000 mPa·s:

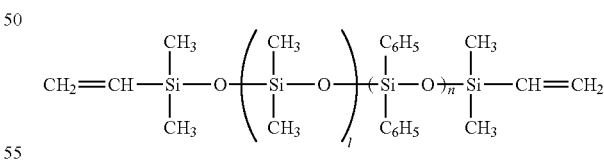

wherein l=50 and n=10, 30 parts of PVMQ as component (B), with a resin structure composed of 36 mol % of $SiO_{4/2}$, 36 mol % of $Me_2SiO_{2/2}$, and 28 mol % of $MePhViSiO_{1/2}$ (Mw, 4,400; the amount of the hydroxyl group bonded to a silicon atom, 6 mass %; the amount of the alkoxy group (MeO) bonded to a silicon atom, 1 mass %), the organohydrogenpolysiloxane as used in Example 4, as component (C) in such an amount as to give an SiH/SiVi ratio of 1.0, and 0.05 part of a solution of chloroplatinic acid in octyl alcohol, containing 2 mass % of platinum, as component (D), to prepare a silicone rubber composition wherein an amount of the phenyl group bonded to a silicon atom in the composition was 8%. A cured product was prepared as in Example 1, which was then subjected to the determination of physical properties, as in Example 1. The results are as shown in Table 2.

Comparative Example 3

Well mixed were 7 parts of component (A) as used in Example 1, 30 parts of a vinylphenylmethylpolysiloxane (PVMQ) as component (B), with a resin structure composed of 36 mol % of $SiO_{4/2}$, 36 mol % of $Ph_2SiO_{2/2}$, and 28 mol % of $ViMe_2SiO_{1/2}$ (Mw, 2,000; the amount of the hydroxyl group bonded to a silicon atom, 1 mass %; the amount of the alkoxy group (MeO) bonded to a silicon atom, 20 mass %), the organohydrogenpolysiloxane as used in Example 1, as component (C) in such an amount as to give an SiH/SiVi ratio of 1.0, and 0.05 part of a solution of chloroplatinic acid in octyl alcohol, containing 2 mass % of platinum, as component (D), to prepare a silicone rubber composition wherein an amount of the phenyl group bonded to a silicon atom in the composition was 48%. A cured product was prepared as in Example 1, which was then subjected to the determination of physical properties, as in Example 1. The results are as shown in Table 2.

Comparative Example 4

Well mixed were 7 parts of component (A) as used in Example 1, 30 parts of a vinylphenylmethylpolysiloxane (PVMQ) as component (B), with a resin structure composed of 36 mol % of $SiO_{4/2}$, 36 mol % of $Ph_2SiO_{2/2}$, and 28 mol % of $ViMe_2SiO_{1/2}$ (Mw, 2,000; the amount of the hydroxyl group bonded to a silicon atom, 0.005 mass %; the amount of the alkoxy group (MeO) bonded to a silicon atom, 0.006 mass %), the organohydrogenpolysiloxane as used in Example 1, as component (C) in such an amount as to give an SiH/SiVi ratio of 1.0, and 0.05 part of a solution of chloroplatinic acid in octyl alcohol, containing 2 mass % of platinum, as component (D), to prepare a silicone rubber composition wherein an amount of the phenyl group bonded to a silicon atom in the composition was 48%. A cured product was prepared as in Example 1, which was then subjected to the determination of physical properties, as in Example 1. The results are as shown in Table 2.

Comparative Example 5

Well mixed were 7 parts of component (A) as used in Example 1, 30 parts of a vinylphenylmethylpolysiloxane (PVMQ) as component (B), with a resin structure composed of 36 mol % of $SiO_{4/2}$, 36 mol % of $Ph_2SiO_{2/2}$, and 28 mol % of $ViMe_2SiO_{1/2}$ (Mw, 2,000; the amount of the hydroxyl group bonded to a silicon atom, 20 mass %; the amount of the alkoxy group (MeO) bonded to a silicon atom, 0.1 mass %), the organohydrogenpolysiloxane as used in Example 1, as component (C) in such an amount as to give an SiH/SiVi ratio of 1.0, and 0.05 part of a solution of chloroplatinic acid in octyl alcohol, containing 2 mass % of platinum, as component (D), to prepare a silicone rubber composition wherein an amount of the phenyl group bonded to a silicon atom in the composition was 46%. A cured product was prepared as in Example 1, which was then subjected to the determination of physical properties, as in Example 1. The results are as shown in Table 2.

Comparative Example 6

Well mixed were 7 parts of component (A) as used in Example 1, 30 parts of a vinylphenylmethylpolysiloxane as a comparative component (B), with a resin structure composed of 70 mol % of $PhSiO_{3/2}$, a total 2 mol % of $Ph_2SiO_{2/2}$ and $Me_2SiO_{2/2}$, and 28 mol % of $ViMe_2SiO_{1/2}$ (Mw, 2,000; the amount of the hydroxyl group bonded to a silicon atom, 5 mass %; the amount of the alkoxy group (MeO) bonded to a silicon atom, 0.01 mass %), the organohydrogenpolysiloxane as used in Example 1, as component (C) in such an amount as to give an SiH/SiVi ratio of 1.0, and 0.05 part of a solution of chloroplatinic acid in octyl alcohol, containing 2 mass % of platinum, as component (D), to prepare a silicone rubber composition wherein an amount of the phenyl group bonded to a silicon atom in the composition was 47%. A cured product was prepared as in Example 1, which was then subjected to the determination of physical properties, as in Example 1. The results are as shown in Table 2.

The physical properties of the cured products of the Examples and the Comparative Examples were determined in the following methods.

(1) Refractive Index

A refractive index of a cured product was measured at 25 degrees C. with an Abbe type refractive index meter in accordance with JIS K0061:2001.

(2) Tensile Strength

A tensile strength and an elongation at break of the cured product were measured in accordance with JIS K6249: 2003.

(3) Hardness, Type D

A hardness of a product obtained by curing the composition at 150 degrees C. for one hour, and a hardness of one cured similarly for 4 hours were measured with a Durometer D hardness meter in accordance with JIS K6249:2003.

(4) Surface Tackiness

A surface of the cured product was visually observed to see if dust was attached thereon.

(5) Light Transmittance, as a Measure for Heat Resistance

A light transmittance at 450 nm of the cured product having a thickness of 1 mm was determined at 23 degrees C. with Hitachi Spectrophotometer, U-4100. This transmittance was called "initial transmittance" being 100%. Then, the cured product was heated at 150 degrees C. for 1,000 hours, and its transmittance was determined similarly. This transmittance in %, relative to the initial transmittance, is evaluated.

(6) Water Vapor Permeability

A water vapor permeability through a cured product having a thickness of 1 mm was determined with a water vapor permeability meter, L80-5000, ex Lyssy, in accordance with JIS K7129.

(7) Adhesion Property

O. 25 Gram of the obtained composition was coated on an area of 45 mm$^2$ of a silver plate having a surface area of 180 m$^2$, and cured at 150 degrees C. for 4 hours. A boundary between the cured product and the silver plate was broken with a micro-spatula to observe whether the cured product was not peeled off at the adhesion interface and was broken in cohesive failure. A ratio of the cohesive failure was calculated and evaluated on the following criteria.

Good: the ratio is 60% or higher (i.e., good adhesion)

Bad: the ratio is less than 60% (i.e., bad adhesion)

TABLE 1

| Example | 1 | 2 | 3 | 4 | 5 |
|---|---|---|---|---|---|
| Appearance | Colorless and Transparent | Colorless and Transparent | Colorless and Transparent | Colorless and Transparent | Colorless and Transparent |
| Refractive Index | 1.54 | 1.55 | 1.54 | 1.53 | 1.51 |
| Hardness, Type D, 150 C, 4 hrs. | 50 | 50 | 45 | 45 | 30 |
| Hardness, Type D, 150 C, 1 hr. | 48 | 46 | 42 | 43 | 28 |
| Elongation at Break, % | 60 | 70 | 60 | 50 | 70 |
| Tensile Strength, MPa | 4.5 | 5.1 | 4.3 | 3.8 | 2.8 |
| Light Transmittance, %, initial | 100 | 100 | 100 | 100 | 100 |
| Light Transmittance, %, after Heat Treatment | 98 | 98 | 98 | 99 | 99 |
| Water Vapor Permeability, $g/m^2 \cdot day$ | 8 | 8 | 8 | 9 | 12 |
| Dust Adhesion due to Surface Tackiness | No | No | No | No | No |
| Adhesion to Silver | Good | Good | Good | Good | Good |

TABLE 2

| Comp. Ex. | 1 | 2 | 3 | 4 | 5 | 6 |
|---|---|---|---|---|---|---|
| Appearance | Colorless and Transparent | Colorless and Transparent | Colorless and Transparent | Colorless and Transparent | Colorless and Transparent | Colorless and Transparent |
| Refractive Index | 1.54 | 1.45 | 1.54 | 1.54 | 1.54 | 1.54 |
| Hardness, Type D, 150 C, 4 hrs. | 20 | 30 | 40 | 45 | 40 | 45 |
| Hardness, Type D, 150 C, 1 hr. | 12 | 25 | 36 | 42 | 38 | 43 |
| Light Transmittance, %, initial | 100 | 100 | 100 | 100 | 100 | 100 |
| Light Transmittance, %, after Heat Treatment | 98 | 100 | 98 | 98 | 98 | 92 |
| Elongation at Break, % | 30 | 30 | 50 | 40 | 50 | 50 |
| Tensile Strength, MPa | 1.6 | 2.2 | 3.3 | 3.8 | 3.6 | 3.6 |
| Water Vapor Permeability, $g/m^2 \cdot day$ | 16 | 35 | 9 | 8 | 9 | 9 |
| Dust Adhesion due to Surface Tackiness | No | No | Found | No | Found | No |
| Adhesion to Silver | Good | Good | Good | Bad | Good | Good |

As seen in Table 1, the cured products of Examples 1 to 5 showed the sufficient hardness, refractive index, heat resistance and mechanical properties, and the low water vapor permeability.

Meanwhile, as seen in Table 2, in Comparative Example 1 where the amount of component (B) was less than the lower limit specified in the invention, the speed of curing was slow, and the cured product had the inferior mechanical properties and the high water vapor permeability. In Comparative Example 2 where the amount of the aryl group bonded to a silicon atom was less than the lower limit specified in the invention, the refractive index and the mechanical properties were inferior, and the water vapor permeability was high. In Comparative Examples 3 and 5 where the amount of the hydroxyl group bonded to a silicon atom and the amount of the alkoxy group bonded to a silicon atom in component (B) were larger than the upper limits specified in the invention, respectively, the surfaces of the cured products were tacky. In Comparative Example 4 where the amount of the hydroxyl group bonded to a silicon atom and the amount of the alkoxy group bonded to a silicon atom in component (B) were less than the lower limits specified in the invention, the cured product had the inferior adhesion property. In Comparative Example 6 where component (B) comprised the T unit, the light transmittance decreased much under heating, which means the inferior heat resistance.

The invention claimed is:

1. A curable silicone resin composition comprising:
   (A) an organopolysiloxane having at least two alkenyl groups per molecule, each bonded to a silicon atom and showing a viscosity of 10 to 1,000,000 mPa·s at 25° C.,
   (B) an organopolysiloxane having a weight average molecular weight of 1,000 to 10,000 and having a resin structure composed of:
      10 to 80 mol % of $SiO_{4/2}$ unit,
      0.1 to 80 mol % of $(R^1)_2SiO_{2/2}$ unit, and
      1 to 60 mol % of $(R^2)_3SiO_{1/2}$ unit,
   where:
      each $R^1$ independently represents an alkenyl group having 2 to 8 carbon atoms, or a substituted or unsubstituted, monovalent hydrocarbon group having no aliphatic unsaturated group, and
      each $R^2$ independently represents an alkenyl group having 2 to 8 carbon atoms, or a substituted or unsubstituted, monovalent hydrocarbon group having no aliphatic unsaturated group, provided that at least one among all of $R^2$ is an alkenyl group;
   an amount of a hydroxyl group bonded to a silicon atom in component (B) being 0.01 to 15.0 mass %, relative to a total mass of component (B); and an amount of an alkoxy group bonded to a silicon atom in component (B) being 0.01 to 15.0 mass %, relative to a total mass of component (B),
   (C) an organohydrogenpolysiloxane having at least two hydrogen atoms per molecule, each bonded to a silicon atom, and
   (D) platinum-group metal catalyst,
   wherein
      an amount of component (B) is 81 to 100 mass %, relative to a total mass of components (A) and (B); and
      the number of the aryl group bonded to a silicon atom is 10 to 90%, relative to a total number of the hydrogen atoms each bonded to a silicon atom and the groups each bonded to a silicon atom, including the aryl group bonded to a silicon atom, in the composition.

2. The curable silicone resin composition according to claim 1, wherein an amount of component (C) is such that a ratio of the total number of the hydrogen atoms each bonded to a silicon atom in component (C) to the total number of the alkenyl groups each bonded to a silicon atom in components (A) and (B) is 0.1 to 4.0.

3. The curable silicone resin composition according to claim 1, wherein
   a cured product obtained by curing the composition at 150° C. for one hour has a hardness corresponding to at least 70% of a hardness of a cured product obtained by curing the composition at 150° C. for 4 hours, and the hardness is determined in accordance with JIS K6249:2003.

4. A cured product obtained by curing the curable silicone resin composition according to claim 1, wherein the cured product has a refractive index of 1.46 to 1.60.

5. The cured product obtained by curing the curable silicone resin composition according to claim 1, wherein the cured product has a water vapor permeability of 30 g/m² day, the cured product having a thickness of 1 mm.

6. The cured product obtained by curing the curable silicone resin composition according to claim 1, wherein the cured product has a tensile strength of at least 2.0 MPa and an elongation at break of at least 40%, both as determined in accordance with JIS K6249:2003.

7. The curable silicone resin composition according to claim 2, wherein
   a cured product obtained by curing the composition at 150° C. for one hour has a hardness corresponding to at least 70% of a hardness of a cured product obtained by curing the composition at 150° C. for 4 hours, and the hardness is determined in accordance with JIS K6249:2003.

8. A cured product obtained by curing the curable silicone resin composition according to claim 2, wherein the cured product has a refractive index of 1.46 to 1.60.

9. A cured product obtained by curing the curable silicone resin composition according to claim 3, wherein the cured product has a refractive index of 1.46 to 1.60.

10. A cured product obtained by curing the curable silicone resin composition according to claim 7, wherein the cured product has a refractive index of 1.46 to 1.60.

11. The cured product obtained by curing the curable silicone resin composition according to claim 2, wherein the cured product has a water vapor permeability of 30 g/m²·day, the cured product having a thickness of 1 mm.

12. The cured product obtained by curing the curable silicone resin composition according to claim 3, wherein the cured product has a water vapor permeability of 30 g/m²·day, the cured product having a thickness of 1 mm.

13. The cured product obtained by curing the curable silicone resin composition according to claim 7, wherein the cured product has a water vapor permeability of 30 g/m²·day, the cured product having a thickness of 1 mm.

14. The cured product obtained by curing the curable silicone resin composition according to claim 2, wherein the cured product has a tensile strength of at least 2.0 MPa and an elongation at break of at least 40%, both as determined in accordance with JIS K6249:2003.

15. The cured product obtained by curing the curable silicone resin composition according to claim 3, wherein the cured product has a tensile strength of at least 2.0 MPa and an elongation at break of at least 40%, both as determined in accordance with JIS K6249:2003.

16. The cured product obtained by curing the curable silicone resin composition according to claim 7, wherein the cured product has a tensile strength of at least 2.0 MPa and an elongation at break of at least 40%, both as determined in accordance with JIS K6249:2003.

* * * * *